United States Patent
Kawabe et al.

[11] Patent Number: 6,116,627
[45] Date of Patent: Sep. 12, 2000

[54] FRONT SUSPENSION

[75] Inventors: Yoshihiro Kawabe; Takuya Murakami; Kenji Kawagoe; Tamiyoshi Kasahara, all of Kanagawa, Japan

[73] Assignee: Nissan Motor Co., Ltd., Kanagawa, Japan

[21] Appl. No.: 08/944,445

[22] Filed: Oct. 6, 1997

[30] Foreign Application Priority Data

Oct. 4, 1996  [JP]  Japan .................................. 8-264855

[51] Int. Cl.$^7$ ........................................ B60G 7/00
[52] U.S. Cl. ................................ 280/124.15; 280/124.1; 280/124.135; 280/124.146
[58] Field of Search .................... 280/124.1, 124.125, 280/124.13, 124.135, 124.145, 124.146, 124.147, 124.154, 124.155, 124.162, 93.512, 124.15, 124.134, 124.143

[56] References Cited

U.S. PATENT DOCUMENTS

| | | | |
|---|---|---|---|
| 5,348,241 | 9/1994 | Lee | 280/124.142 |
| 5,348,337 | 9/1994 | Ando | 280/124.143 |
| 5,868,410 | 2/1999 | Kawabe et al. | 280/124.15 |
| 5,873,587 | 2/1999 | Kawabe et al. | 280/124.145 |

FOREIGN PATENT DOCUMENTS

| | | |
|---|---|---|
| 0 548 989 A1 | 6/1993 | European Pat. Off. . |
| 5-178041 | 7/1993 | Japan . |

Primary Examiner—Eric Culbreth
Attorney, Agent, or Firm—McDermott, Will & Emery

[57] ABSTRACT

A front suspension for an automotive vehicle includes a wheel supporting member for rotatably supporting a road wheel of the vehicle. A lower link has a first end section rotatably connected to a lower section of the wheel supporting member, and a second end section connected to a vehicle body-side member so as to be swingable generally in a vertical direction of the vehicle. A connection member is rotatably installed to an upper section of the wheel supporting member so as to be rotatable around a first axis which passes through the wheel supporting member and extends generally in the vertical direction of the vehicle. A shock absorber has an upper end section pivotally connected to the vehicle body-side member, and a lower end section swingably connected to the connection member to be rotatable around a second axis which extends generally in a fore-and-aft direction of the vehicle. A spring is supported by the shock absorber and has a third axis. The extension of the third axis is separate from an extension of the first axis on a horizontal plane extending in a horizontal direction of the vehicle. The third axis inclines relative to the first axis on a vertical plane extending in a vertical direction of the vehicle. An upper link has a first end section swingably connected to the connection member, and a second end section swingably connected to the vehicle body-side member. The upper link has a fourth axis which connects a first connecting point at which the first end section is connected to the connection member and a second connecting point at which the second end section is connected to the vehicle body-side member. The fourth axis crosses the first axis on the vertical plane and on the horizontal plane. Additionally, a tie rod is provided to turn the wheel supporting member upon its movement in the width direction of the vehicle in accordance with a steering operation for the vehicle.

13 Claims, 8 Drawing Sheets

FRONT SUSPENSION

The contents of Japanese Patent Application No. 8-264855, with a filing date of Oct. 4, 1996 in Japan, are hereby incorporated by reference.

BACKGROUND OF THE INVENTION

1. Field of the Invention

This invention relates to improvements in a front suspension of an automotive vehicle, and more particularly to the improvements in a front suspension of the type possessing both features of a strut type one and a double wishbone type one.

2. Description of the Prior Art

A variety of front suspensions have been hitherto proposed and put into practical use in the field of automotive vehicle. One of them is disclosed in Japanese Patent Provisional Publication No. 5178041. This front suspension is for an automotive vehicle and includes a steering knuckle (wheel supporting member) which has a lower end section which is swingably connected through a lower arm to a vehicle body (or a vehicle body-side member). A connection member is pivotally connected to the upper end section of the steering knuckle so as to be rotatable around the axis of a vertical shaft (or an installation shaft) projected from the upper end section of the steering knuckle. The connection member is pivotally connected to the lower end of a damper or shock absorber so as to be generally vertically swingable. An upper arm has one end section which is pivotally connected at a single point with the vehicle body, and another end section which is connected rotatably around the axis of a connection shaft extending generally in the fore-and-aft direction of the vehicle. More specifically, the latter end section of the upper arm is, for example, bifurcated to form two end portions which are located forward and rearward in the fore-and-aft direction of the vehicle. The two end portions are pivotally connected at respective two points with the connection member. The thus arranged front suspension is provided with advantages of both the strut type one and the double wishbone type. That is, the front suspension has an alignment similar to that of the double wishbone type one as viewed from the front of the vehicle thereby exhibiting a high stiffness against force input from a lateral direction even if the upper arm is disposed at a lower position, while has an alignment similar to that of the strut type one as viewed from a side of the vehicle thereby allowing to locate at a higher position the vehicle body-side connecting point of the shock absorber serving substantially as an upper arm thus attaining both a low stiffness in the fore-and-aft direction and a high caster stiffness. As a result, by appropriately combining both the features of the strut and double wishbone type suspensions, good ride-in comfortableness and driving stability can be obtained.

However, drawbacks have been encountered in the above-discussed conventional front suspension in which the upper arm is rotatable only around the axis of the connection shaft extending in the fore-and-aft direction of the vehicle, for example, because the upper link is connected at the two points with the connection member. That is, when the connection member is in a condition to rotate around the axis of the installation shaft upon receiving force input from the spring, the upper link does not positively make its displacement because the upper link is pivotally connected with the connection member to be allowed to make its vertical swinging movement and is pivotally connected at the single point with the vehicle body-side member. In other words, when a vertical force is input to a front wheel, the upper link makes only its vertical swinging movement, so that movements (such as a movement under distortion of an elastic bushing) other than this vertical swinging movement are restricted. As a result, the connecting points between the connection member and the upper link cannot displace in directions other than the vertical swinging movement directions when a vertical force is applied to the front suspension or when the front wheel moves vertically, i.e., under wheel stroke, thereby not positively affecting the movement of the front wheel. Therefore, it is impossible to positively change the alignment of the front suspension when the vertical force is applied to the suspension and to appropriately set change in alignment under the vertical movement of the front wheel.

BRIEF SUMMARY OF THE INVENTION

The present invention has been developed to be intended to solve the above drawbacks encountered in the conventional front suspension. According to the present invention, an upper link is connected at a single point with a connection member. By virtue of this, freedom in layout for the front suspension can be improved maintaining good performance (such as stiffness) of the front suspension, while causing the connection member to be rotated under the force of a spring of a strut thereby appropriately setting toe angle and camber angle of the front wheel during vertical movement of the front wheel. Additionally, the movement of the front wheel (such as camber angle change) during the vertical movement of the front wheel can be appropriately set by taking account of the rotational movement of the connection member in addition to a so-called suspension geometry including length and angle of the upper link and lower link determined, for example, by layout and distortion of elastomeric bushings used in sections other than the upper link. These effectively improve driving stability of the vehicle.

It is an object of the present invention to provide an improved front suspension for an automotive vehicle, which effectively overcomes drawbacks encountered in conventional front suspensions for an automotive vehicle.

Another object of the present invention is to provide an improved front suspension for an automotive vehicle, which can improve freedom in layout of the front suspension while maintaining an appropriate balance among camber stiffness, lateral stiffness and the like of the front suspension.

A further object of the present invention is to provide an improved front suspension for an automotive vehicle, which can appropriately set toe angle and camber angle of a front wheel and set movements (such as camber angle change) of the front wheel, thereby making it possible to suitably set movement of a front tire.

A still further object of the present invention is to provide an improved front suspension for an automotive vehicle, in which the axis of a spring of a strut and the axis of a connection member are in a so-called torsional locational relationship, so that a displacement occurs between an upper link and the connection member under the action of force of the spring.

A front suspension of the present invention is for a vehicle and comprises a wheel supporting member for rotatably supporting a road wheel of the vehicle. A lower link has a first end section rotatably connected to a lower section of the wheel supporting member, and a second end section connected to a vehicle body-side member so as to be swingable generally in a vertical direction of the vehicle. A connection member is rotatably installed to an upper section of the wheel supporting member so as to be rotatable around a first axis which passes through the wheel supporting member and extends generally in the vertical direction of the vehicle. A shock absorber has an upper end section pivotally connected to the vehicle body-side member, and a lower end section swingably connected to the connection member to be rotatable around a second axis which extends generally in a fore-and-aft direction of the vehicle. A spring is supported by the shock absorber and has a third axis. The extension of the third axis is separate from an extension of the first axis on a horizontal plane extending in a horizontal direction of the vehicle. The third axis inclines relative to the first axis on a vertical plane extending in a vertical direction of the vehicle. An upper link has a first end section swingably connected to the connection member, and a second end section swingably connected to the vehicle body-side member. The upper link has a fourth axis which connects a first connecting point at which the first end section is connected to the connection member and a second connecting point at which the second end section is connected to the vehicle body-side member. The fourth axis crosses the first axis on the vertical plane and on the horizontal plane. Additionally, a tie rod is provided to turn the wheel supporting member upon its movement in the width direction of the vehicle in accordance with a steering operation for the vehicle.

According to the principle of the present invention, the upper link is connected at the single connecting point to the connection member so as to be simply swingable, thereby being prevented from being connected to be swingable only around an axis extending generally in the fore-and-aft direction of the vehicle. Additionally, the upper link axis or fourth axis (connecting the first connecting point at which the upper link is connected to the connection member and the second connecting point at which the upper link is connected to the vehicle body-side member) crosses the axis (the first axis) of the connection member at the crossing point on the vertical and horizontal planes. Accordingly, freedom in layout can be improved while maintaining an appropriate balance among camber stiffness, lateral stiffness and the like of the front suspension. Furthermore, the extension of the axis (the third axis) of the spring is separate from the extension of the axis (the first axis) of the connection member on the horizontal plane, and the axis of the spring inclines relative to the axis (the first axis) of the connection member on the vertical plane. In other words, the axis of the spring and the axis of the connection member is in a so-called torsional locational relationship, and therefore a displacement occurs between the upper link and connection member under the action of force of the spring, thereby enabling movement of a front tire to be set. This makes it possible to appropriately set toe angle and camber angle of the front wheel by displacing the upper link with the rotational movement of the connection member under vertical force input to the front wheel, and to appropriately set movements (such as camber angle change) of the front wheel by causing the connection member to rotate also under vertical movement of the wheel or wheel stroke, thus suitably controlling movements of the front tire.

BRIEF DESCRIPTION OF THE DRAWINGS

In the drawings, like reference numerals designate like parts and elements throughout all figures, in which.

DETAILED DESCRIPTION OF THE INVENTION

Figure 1:
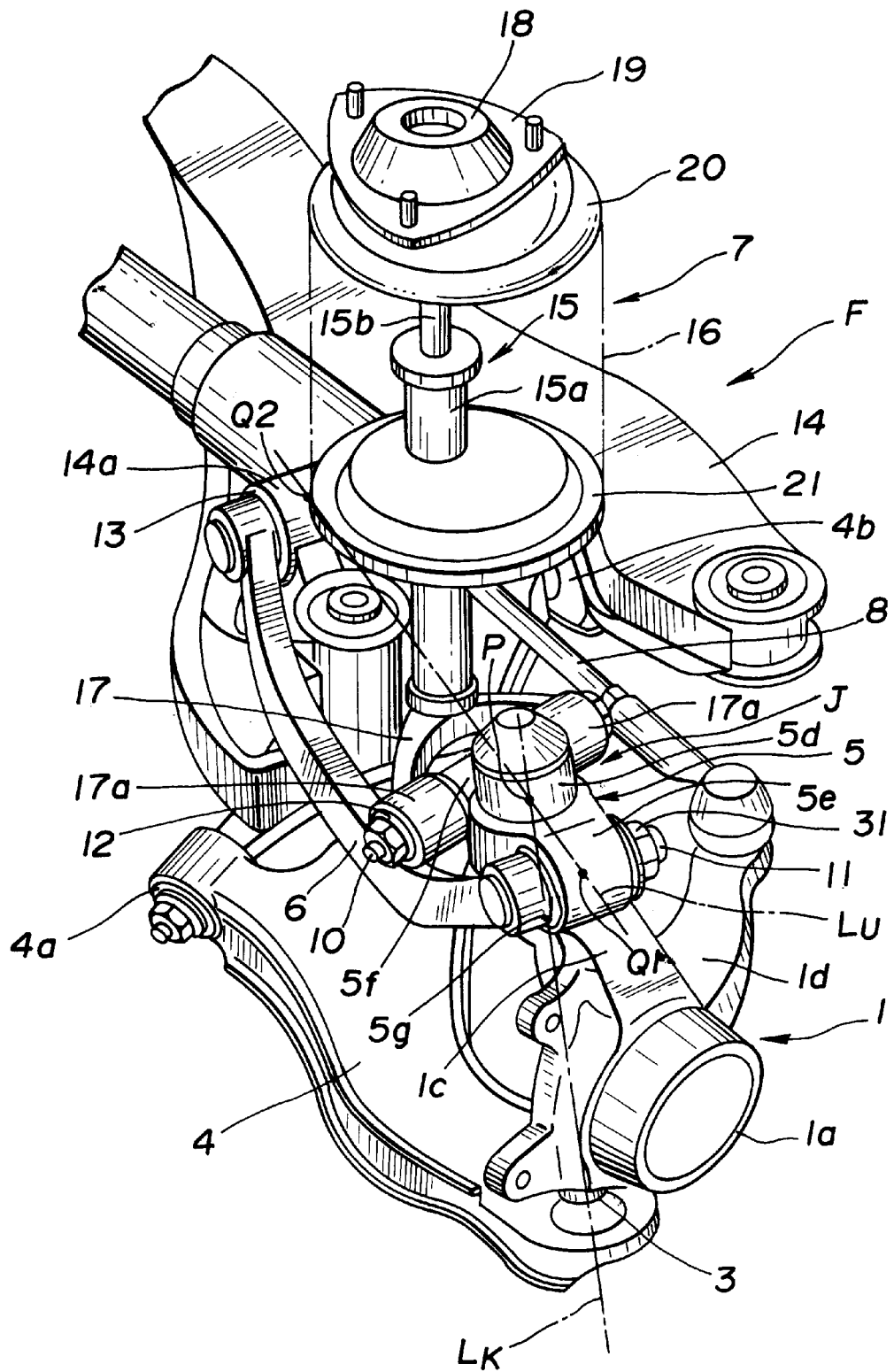
FIG. 1 is a fragmentary perspective view of a front suspension according to the present invention.

Referring now to FIGS. 1 to 5 of the drawings, an embodiment of a front suspension according to the present invention is illustrated by the reference character F. The suspension F of this embodiment is for a left front (road) wheel of an automotive vehicle, and therefore another similar suspension is used for a right front wheel in such a manner as to be located generally symmetrical to the suspension F shown in FIG. 1. Although a pair of the front suspensions are thus generally symmetrically provided, explanation of the present invention will be made on only the front suspension for the left front wheel for the purpose of simplicity of illustration.

The front suspension F comprises a steering knuckle or wheel supporting member 1 for rotatably supporting the left front wheel. The steering knuckle 1 includes a cylindrical section 1a into which a front axle or drive shaft of the front wheel is inserted so as to be rotatably supported. The cylindrical section 1a is formed at a vertically central section of the steering knuckle 1. The steering knuckle 1 includes a lower end section 1b to which a lower link 4 is connected through a ball joint 3. The steering knuckle 1 further includes an upper end section 1c to which an upper link 6 and a strut 7 are connected through a rotational joint J. A tie rod 8 is connected to a tie rod support section 1d which is located at the vertically central section 1c of the steering knuckle 1 and projects rearward relative to the vehicle.

The lower link 4 is disposed extending in the direction of width of the vehicle and has an outboard-side end section (no numeral) which is pivotally connected through the ball joint 3 to the lower end section 1b of the steering knuckle 1. The inboard-side end section (no numeral) of the lower link 4 is bifurcated to form two end or link portions (no numeral) which are respectively connected through elastomeric bushings 4a, 4b to a vehicle body-side member such as a suspension member 14, so that the lower link 4 takes the generally A-shape in plan. Accordingly, the lower link 4 allows vertical movements of the steering knuckle 1 or bound and rebound of the front wheel but obstructs movement of the steering knuckle 1 in the fore-and-aft direction of the vehicle.

The rotational joint J includes an installation shaft K which extends upward from the upper end section 1c of the steering knuckle 1. The installation shaft K has an axis $L_K$ which is aligned with the extension of a kingpin axis which passes through the center (or a connecting point R in FIG. 4) of the ball joint 3. The connecting point R is contained in a connecting section between the outboard-side end section of the lower link 4 and the lower end section 1b of the steering knuckle 1. The rotational joint J further includes a rotatable connection member 5 which is rotatably mounted or supported on the installation shaft K through bearings (not shown). Accordingly, the axis of the rotatable connection member 5 is also aligned with the axis $L_K$ and the extension of the kingpin axis. It will be understood that the axis $L_K$ extends generally vertically relative to the vehicle.

The rotatable connection member 5 includes a shaft cylinder 5*d* which is rotatably and coaxially mounted on the installation shaft K in a manner to cover the installation shaft K. The shaft cylinder 5*d* is integrally provided with two support sections 5*e*, 5*f* which respectively project outward and inward in the width direction of the vehicle. The support sections 5*e*, 5*f* are respectively adapted to support the upper link 6 and a shock absorber 15. The support section 5*e* is formed generally cylindrical and provided thereinside with a cylindrical elastomeric bushing 5*g*. The axis of the generally cylindrical support section 5*e* extends generally in the fore-and-aft direction of the vehicle. The support section 5*f* is formed generally cylindrical and has an axis which extends generally in the fore-and-aft direction of the vehicle. A connection shaft 10 is inserted through the generally cylindrical support section 5*f*.

The upper link 6 includes a generally I-shaped link section (no numeral) which extends generally in the width direction of the vehicle. In practice, the I-shaped link section slightly inclines relative to the width direction of the vehicle and therefore precisely does not extend in the width direction of the vehicle as discussed after. A pivot shaft 11 extends generally in the fore-and-aft direction of the vehicle, from the outboard-side end portion of the I-shaped link section. The pivot shaft 11 is inserted inside the elastomeric bushing 5*g* located inside the support section 5*e*, in such a manner that its tip end portion projects out of the support section 5*e*. The tip end portion of the pivot shaft 11 is formed with a threaded part on which a nut 31 is engaged and tightened. Accordingly, the outboard-side end section of the upper link 6 is pivotally connected to the rotatable connection member 5.

Figure 5:
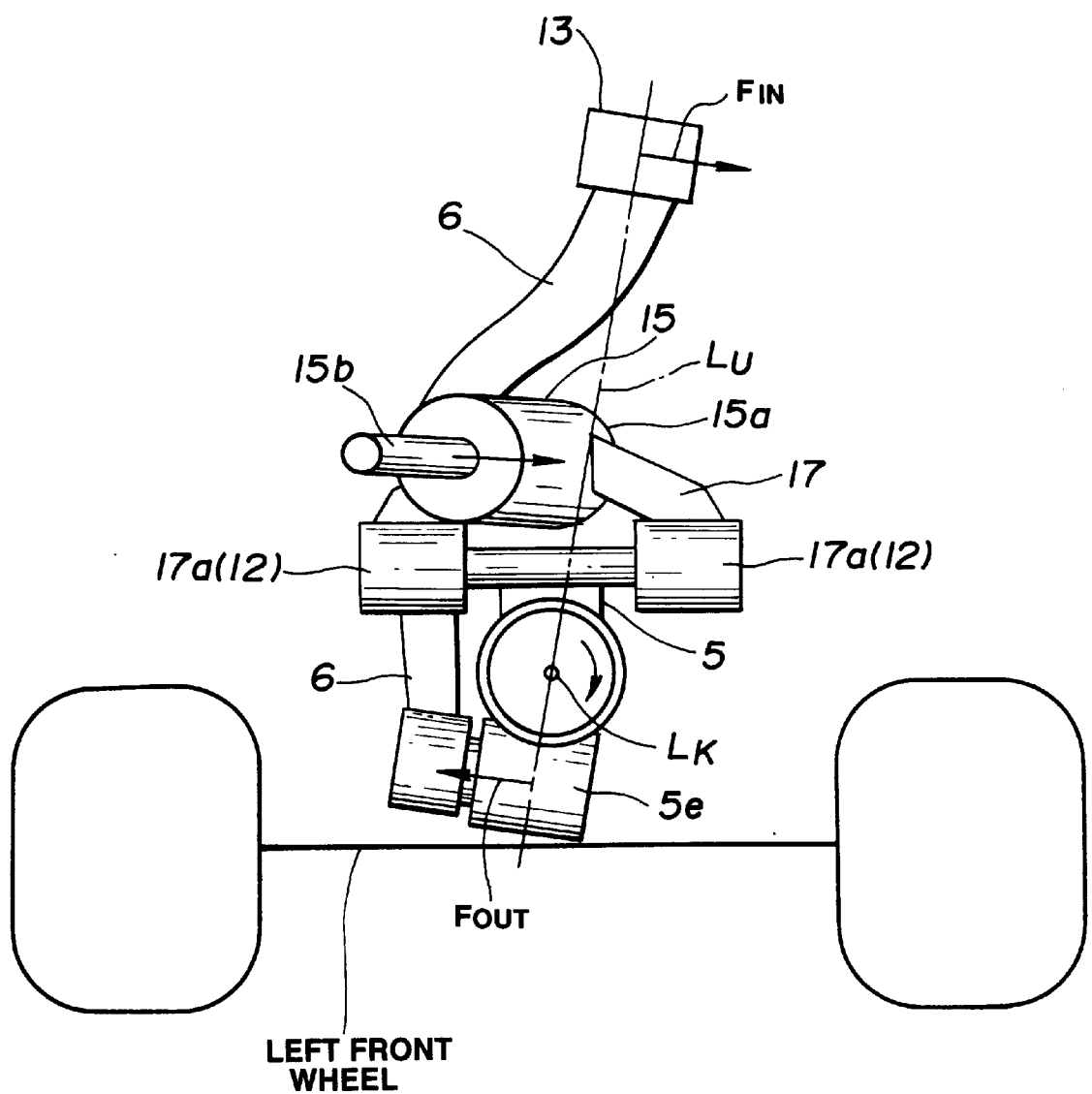
FIG. 5 is a schematic plan view of the front suspension of FIG. 1.

The inboard-side end portion of the I-shaped link section of the upper link 6 is integrally provided with a pivot shaft (not shown) which extends generally in the fore-and-aft direction and disposed inside an elastomeric bushing 13 which is disposed inside a generally cylindrical support section 14*a* forming part of the suspension member 14. Accordingly, the inboard-side end section of the upper link 6 is pivotally connected to the suspension member 14. The suspension member 14 is connected through a suspension member insulator 14*b* to a side member M. The upper link 6 is disposed such that the I-shaped link section extends passing by the front side of the rotatable connection member 5 of the rotational joint J, and inclines relative to the width direction of the vehicle in a manner that the outboard-side end portion of the I-shaped link section is located forward relative to the inboard-side end portion of the I-shaped link section as shown in FIG. 5.

Figure 2:
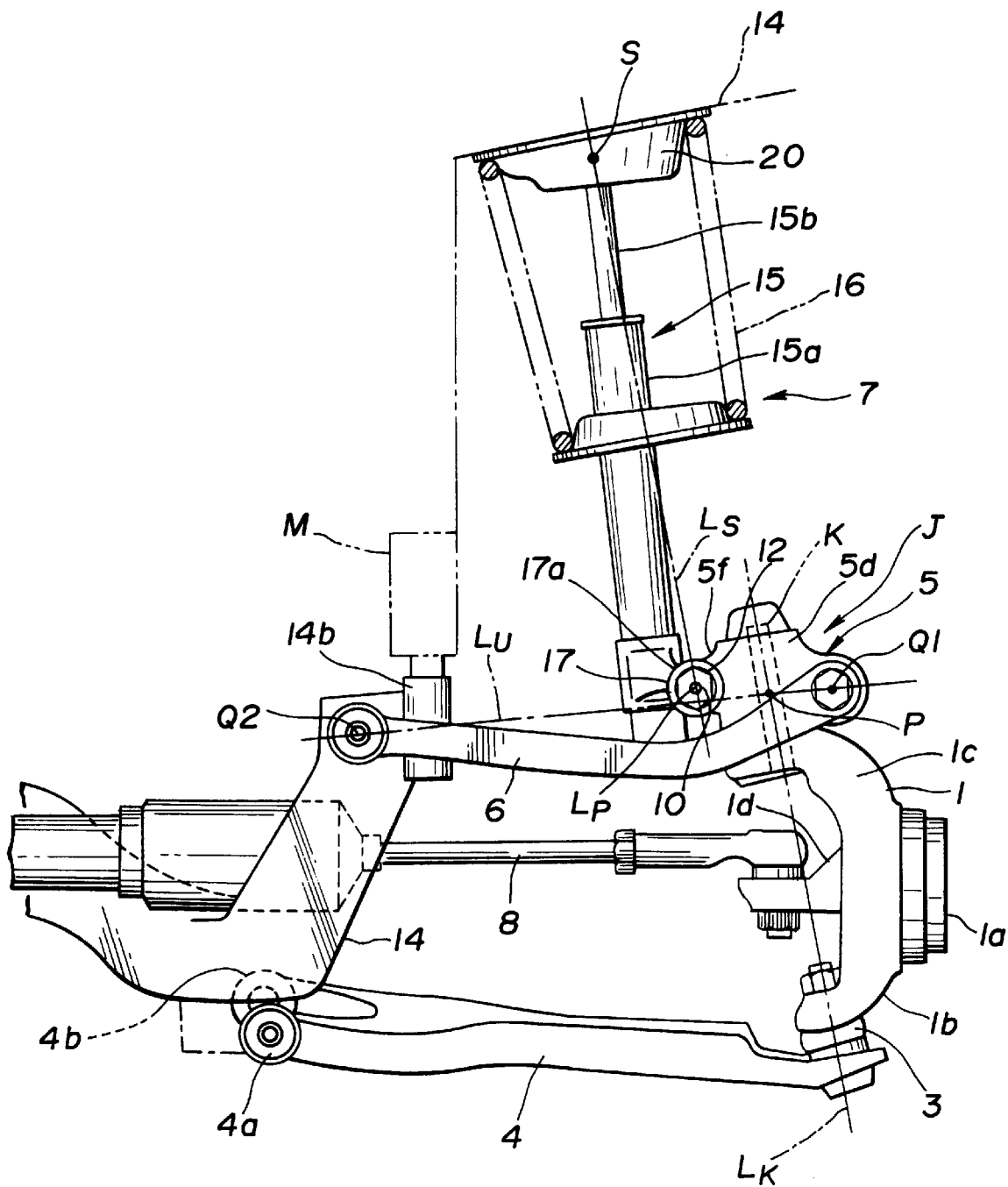
FIG. 2 is a fragmentary front view of the front suspension of FIG. 1.

As shown in FIGS. 1 and 2, the upper link 6 has an axis (referred to as an "upper link axis") $L_U$ which crosses the axis $L_K$ of the installation shaft at a crossing point P. The upper link axis $L_U$ passes through a first point Q1 which is the axial center of the cylindrical elastomeric bushing 5*g* located inside the support section 5*e*, and a second point Q2 which is the axial center of the cylindrical elastomeric bushing 13 located inside the support section 14*a*. The axial center of the cylindrical elastomeric bushing 5*g*, 13 corresponds to a pivotal center which cannot be moved even if a rotational torque is applied to each bushing 5*g*, 13.

The upper link axis $L_U$ is perpendicular to the axis of the cylindrical elastomeric bushing 5*g* and the axis of the cylindrical elastomeric bushing 13 as seen in FIG. 2. The first point Q1 serves as a connecting point between the upper link 6 and the rotatable connection member 5 and is located at the outboard side relative to the axis $L_K$ of the installation shaft in the vehicle as shown in FIGS. 1 and 2. A connecting section (containing the connecting point Q1) between the upper link 6 and the rotatable connection member 5 is to be positioned inside an inboard-side depression of the front wheel (not shown). The second point Q2 serves as a connecting point of a connecting section between the upper link 6 and the vehicle body-side member 14.

The strut 7 includes a shock absorber 15 which has a cylinder tube 15*a*. A spring 16 is disposed around the upper section of the shock absorber 15. A generally C-shaped support bracket 17 is fixedly installed to the lower end of the cylinder tube 15*a*. The support bracket 17 is swingably connected to the support section 5*f* of the rotatable connection member 5. The shock absorber 15 has a piston rod 15*b* which projects from the upper end of the cylinder tube 15*a*. The upper end section of the piston rod 15 *b* is secured through a mound rubber 18 and an installation plate 19 to the vehicle body-side member 14 such as a strut tower or the like.

Here, brief and clear explanation will be made on a structure for connecting the cylinder tube 15 *a* of the shock absorber 15 to the upper end section 1*c* of the steering knuckle 1. The C-shaped support bracket 17 is integrally provided at its opposite end sections with two cylindrical members 17*a*, 17*a* each of which is provided thereinside with a cylindrical elastomeric bushing 12. The cylindrical members 17*a*, 17*a* are coaxial with each other and spaced from each other so that the support section 5*f* of the rotatable connection member 5 is interposed therebetween. The connection shaft (such as the bolt or the like) 10 is inserted through the inside holes (not identified) of the cylindrical members 17*a*, 17*a* and of the support section 5*f* of the rotatable connection member 5 which inside holes are in a condition to be aligned with each other. The thus inserted connection shaft 10 is in a state where the opposite end sections project respectively from the outer ends of the cylindrical members 17*a*, 17*a*. Nuts (no numeral) are respectively screwed on the projected opposite end sections of the connection shaft 10 and tightened in position, so that the C-shaped support bracket 17 is rotatably connected to the rotatable connection member 5. Accordingly, the shock absorber 15 is connected to the rotatable connection member 5 in such a manner the shock absorber 15 is allowed merely to rotate around the axis extending generally in the fore-and-aft direction of the vehicle and prevented from other rotations and swinging movements although a slight swingable movement in all directions are possible under deformation of the elastic bushings 12, 12.

Figure 3:
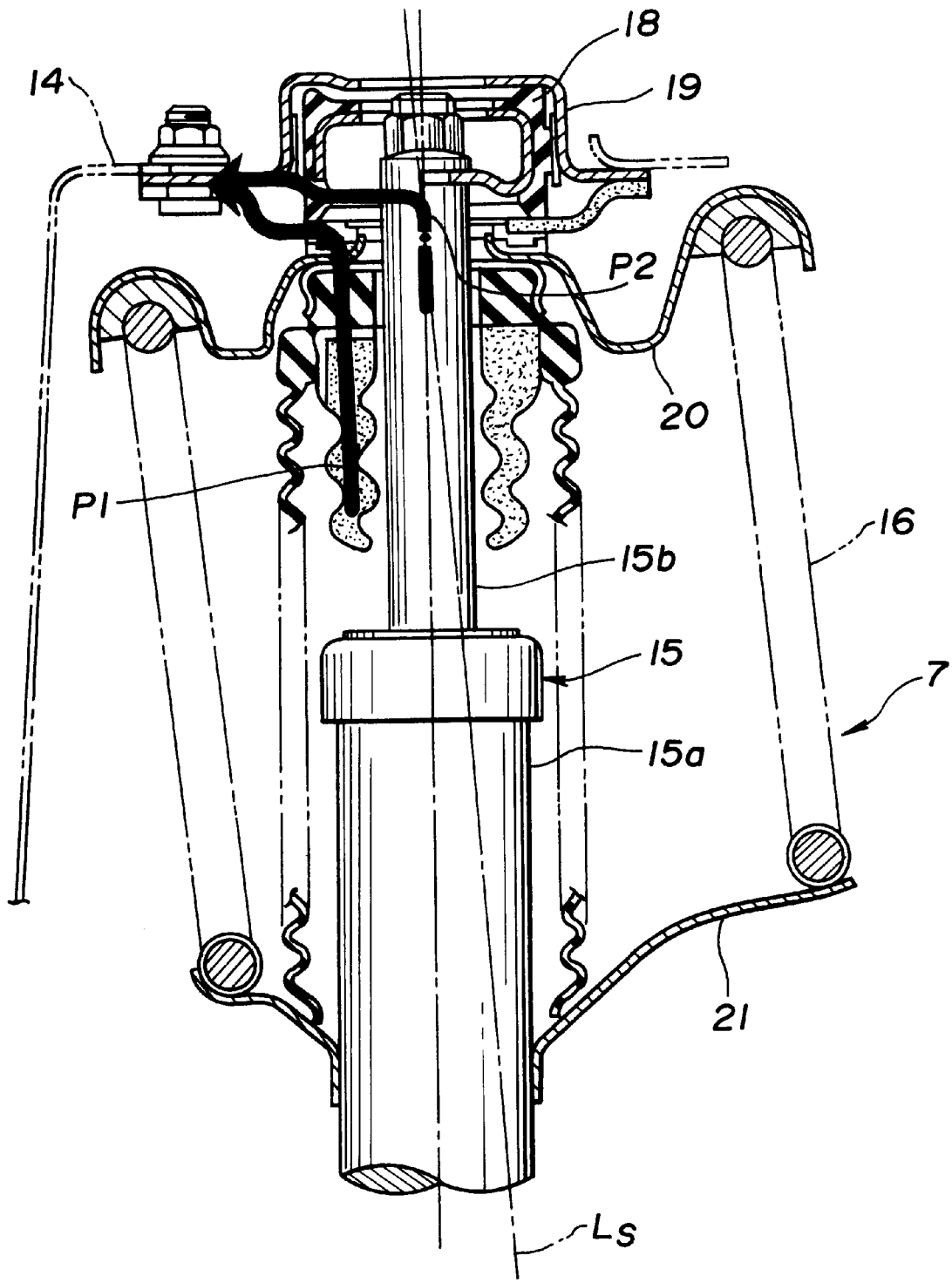
FIG. 3 is a fragmentary vertical sectional view of an upper part of a strut of the front suspension of FIG. 1.

The upper end of the spring 16 is directly installed through the support plate 20 or the like to the vehicle body-side member 14 such as the strut tower or the like. The lower end of the spring 16 is directly installed through the support plate 21 to the cylinder tube 15*a* of the shock absorber 15. In the arrangement of FIG. 3, large vibration input is transmitted through the path P1, whereas fine vibration input is transmitted through the path P2.

Figure 4:
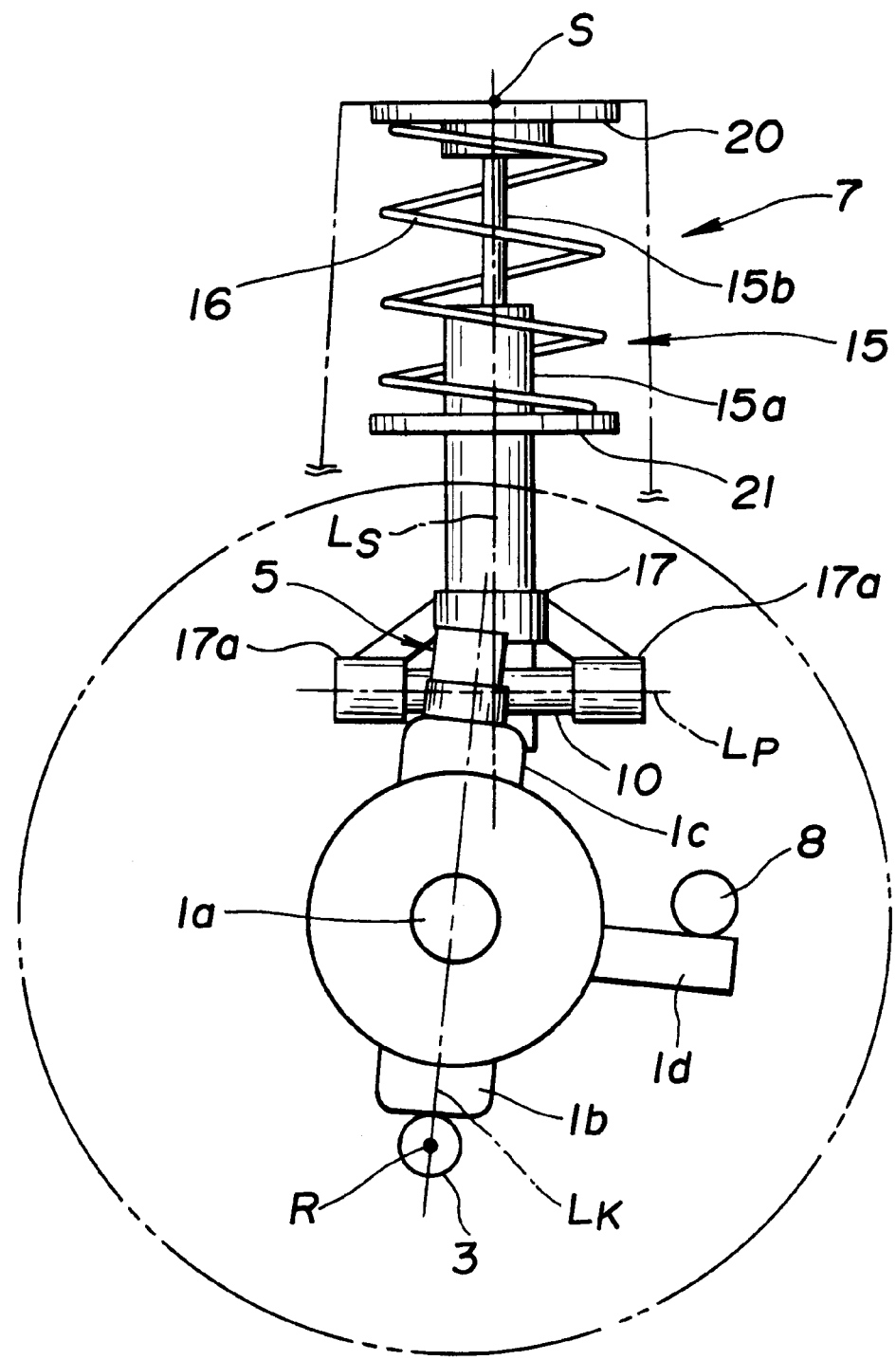
FIG. 4 is a schematic side view of the front suspension of FIG. 1.

In this embodiment, as shown in FIG. 2, the shock absorber 15 and the spring 16 are disposed at the inboard side relative to the axis $L_K$ of the installation shaft K to which the rotatable connection member 5 is coaxially mounted so as to avoid interference with the front wheel or the like. The spring 16 is arranged as follows: The axis $L_S$ of the spring 16 is generally parallel with the axis $L_K$ of the installation shaft K for the rotatable connection member 5 as viewed from the front of the vehicle or on an imaginary vertical plane extending in the width direction of the vehicle, as illustrated in FIG. 2; however, the axis $L_S$ is inclined forward of the vehicle relative to the axis $L_K$ as viewed from the side of the vehicle or on an imaginary vertical plane extending in the fore-and-aft direction of the vehicle, as illustrated in FIG. 4. In other words, the axis $L_K$ and the axis $L_S$ are arranged offset or separate from each other on an imaginary horizontal plane. In other words, the extension of the axis $L_K$ and the extension of the axis $L_S$ is not parallel with each other and do not cross each other at a crossing point, in three-dimensions. Thus, the axis $L_K$ and the axis $L_S$ are in a so-called torsional locational relationship, in which the angle of inclination in the fore-and-aft direction of the vehicle is set smaller than the caster angle of the axis $L_K$ which serves substantially as the king pin axis as shown in FIG. 4. Additionally, as seen in FIG. 2, the axis $L_S$ of the spring 16 passes through a connecting point (vehicle body-side connecting point) S assumed at the center of a connecting section between the spring 16 and the vehicle body-side member 14 such as the strut tower or the like passes, and passes through the axis $L_P$ of the connection shaft 10 on which the support bracket 17 for the shock absorber 15 is rotatably supported. More specifically, the axis $L_S$ of the spring crosses the axis $L_P$ at a crossing point, or passes through a center of the axis $L_P$ of the connecting shaft 10 which center corresponds to the axial center of the inside hole of the support section 5f of the rotatable connection member 5.

The tie rod 8 is connected to a steering gear (not shown) to cause the steering knuckle 1 to rotate around the axis $L_K$ so as to steer the vehicle.

Function of the above front suspension F will be discussed in detail hereinafter.

The front suspension F of this embodiment assumes a double wishbone type suspension including the lower link 4 and the upper link 6 as viewed from the fore-and-aft direction of the vehicle while a strut type suspension including the lower link 4 and the strut 7 as viewed from the width direction of the vehicle. Accordingly, the front suspension F of this embodiment can exhibit advantages of both the wishbone type and strut type suspensions and omit the shortcomings of them. More specifically, as viewed from the front of the vehicle as illustrated in FIG. 2, the movement of the front wheel (movement of the steering knuckle 1) with wheel stroke is restricted by the lower link 4 and the upper link 6, and therefore the front suspension F functions like the double wishbone type one. As viewed from the lateral direction of the vehicle as illustrated in FIG. 4, the same movement of the front wheel is restricted by the lower link 4 and the shock absorber 15, and therefore the front suspension F functions like the strut type one. Regarding force input to the front wheel and the steering knuckle 1, the force input in the fore-and-aft direction is received by the lower link 4 and the strut 8 like in the strut type suspension; while the force input in the lateral direction is received by the lower link 4 and the upper link 6 like in the double wishbone type.

Accordingly, the front suspension F of this embodiment can obtain a high stiffness against a force input from the lateral direction of the vehicle by disposing the upper link at a lower position as viewed from the front of the vehicle. Additionally, the front suspension F can obtain a high caster stiffness and lower the stiffness against a force input in the fore-and-aft direction of the vehicle since the vehicle body-side connecting point S of the shock absorber serving practically as an upper link is disposed at a higher position as viewed from the front of the vehicle. Thus, both high ride-in comfortableness and driving stability of the vehicle can be attained by suitably combining the features of the double wishbone type and strut type suspensions. Furthermore, in this embodiment, the upper link is disposed at the lower position as discussed above, the suspension F can be small-sized and obtains high stiffness and precision by installing the suspension F to the suspension member 14.

When a lateral force directing to the inboard side of the vehicle acts on the steering knuckle 1, for example, during a turn of the vehicle, the lateral force reached to the steering knuckle 1 is then transmitted to the rotatable connection member 5 since the lower section of the steering knuckle is restrained from its movement in the width direction of the vehicle under the action of the lower link 4, and therefore the lateral force is applied to the axis $L_K$ (serving as the kingpin axis) of the installation shaft K for the rotatable connection member 5. The strut 7 including the shock absorber 15 hardly generates a reaction against the lateral force since the connection shaft 10 is disposed extending in the fore-and-aft direction of the vehicle. In contrast, a large reaction against the lateral force can be generated at the upper link axis $L_U$ since the upper link axis $L_U$ crosses the axis $L_K$ of the installation shaft K for the rotatable connection member 5 at the crossing point P. In other words, only compressive or tensile axial force simply acts on the upper link axis $L_U$ upon omitting a minute force generated owing to torsion of each elastomeric bushing disposed at the connecting section between the upper link 6 and the vehicle body-side member 14 and between the upper link 6 and the rotatable connection member 5, thereby generating no moment for causing the rotatable connection member 5 to rotate around the axis $L_K$ of the installation shaft K for the rotatable connection member 5. It is to be noted that when a lateral force is input through the steering knuckle 1 so that a reaction along the upper link axis $L_U$ serves as a component force, a small force to be applied in the fore-and-aft direction of the vehicle is generated as a component force, since the upper link axis $L_K$ is arranged inclined relative to the width direction of the vehicle. This small force acts on the rotatable connection member 5; however, it is received by the strut 7 similarly to in case that the fore-and-aft direction force acts on the front wheel as discussed above, and therefore no lowering is made in camber stiffness and in lateral stiffness under a condition where the upper link 6 and the rotatable connection member 5 are connected at the single connecting point.

In this connection, in the conventional front suspension as disclosed in Japanese Patent Provisional Publication No.5-178041, moment for rotating the rotatable connection member is generated under the action of the axial force of the upper link and force input from the installation section of the steering knuckle to the rotatable connection member. In order to prevent generation of such moment, it is necessary that installation of the upper link to the rotatable connection member is made in such a manner that the upper link is rotatable only around the axis extending in the fore-and-aft direction of the vehicle. Accordingly, it is required that, for example, the upper link is connected at two points with the rotatable connection member.

In this embodiment, when a force input in the fore-and-aft direction of the vehicle is made onto the steering knuckle, the fore-and-aft direction force input is applied through the axis $L_K$ of the installation shaft K for the rotatable connection member 5 under a normal condition where the connection shaft 10 for connecting the strut 7 and the rotatable connection member 5 is directed in the fore-and-aft direction of the vehicle. This force input can be resisted by reactions applied to the connection shaft 10 for connecting the strut 7 and the rotatable connection member 5 and to the vehicle body-side connecting point S located at the upper part of the strut 7, thereby securely preventing the steering knuckle 1 from displacing in the fore-and-aft direction. Additionally, when the connection shaft 10 between the strut 7 and the rotatable connection member 5 moves to rotate around the axis $L_K$ corresponding to the kingpin axis, it is assumed that the rotatable connection member 5 and the strut 7 rotate around the axis $L_K$ of the installation shaft for the rotatable connection member 5 and round the axis of the strut 7. In this case, it seems necessary to change the length of the upper link 6; however, such rotational displacement cannot occur in practice under the action of reaction of the upper link 6.

Further, in this embodiment, the outboard-side end section of the upper link 6 is supported to the support section 5e at the outboard side of the rotatable connection member 5, and therefore the length of the upper link 6 can be set larger. This optimizes change in camber angle caused with wheel stroke, and reduces an angle of twist of the elastomeric bushing under a condition where an axial force is applied to the upper link, thereby linearizing the durability of the bushing and the camber angle change while improving ride-in comfortableness of the vehicle.

Each of the elastomeric bushings 5g, 13 disposed respectively inside the support section 14a of the vehicle body-side member 14 and the support section 5e of the rotatable connection member 5 is arranged such that its axis is perpendicular to the upper link axis $L_U$. This can minimize a force to be applied in the axial direction of the upper link 6, i.e., a displacement amount of the elastomeric bushing upon application of an axial force to the upper link, thereby maintaining an appropriate balance among camber stiffness, lateral stiffness and the like.

In this embodiment, the axis $L_K$ of the installation shaft K for the rotatable connection member 5 passes through the center of the ball joint (bushing) 3 which center serves as the connecting point between the steering knuckle 1 and the lower link 4. In other words, the axis $L_K$ of the installation shaft K is aligned with the kingpin axis. Accordingly, even though the steering knuckle 1 is turned through the tie rod 8 by the steering gear to steer the front wheel, the rotatable connection member 5 makes no rotation so that force input with steering the front wheel cannot act on the upper link 6.

Thus, in this embodiment, each opposite end section of the upper link 6 is connected at the single point with the vehicle body-side member 14 or the steering knuckle 1 while securely preventing camber stiffness and lateral stiffness from being lowering. As a result, freedom in layout is increased to avoid interference and the like of the front suspension F with a tire and/or an installation section of the front wheel particularly during steering the front wheel, and additionally it is made possible to reduce weight and production cost of the front suspension F. Further, by suitably selecting the spring constant of the spring 16 of the strut 7, the elastic coefficient of the elastomeric bushings and the length of the links, different front suspensions suitable for different kinds of vehicles can be arranged while making it possible to use the same front suspension commonly in different kinds of vehicles.

Furthermore, the front suspension F of this embodiment employs the particular support structure for the shock absorber 15 and the spring 16 to constitute the input separation type strut. Additionally, the axis $L_S$ of the spring 16 crosses the axis $L_P$ of the connection shaft 10 between the shock absorber 15 and the rotatable connection member 5 to form a crossing point, as shown in FIG. 2. As a result, a rotational torque around the axis $L_P$ of the connection shaft 10 cannot be input as a bending force onto the shock absorber 15 when a vertical force due to the vehicle weight or the like is input to the front wheel, thereby reducing a friction of the shock absorber thus to improve the ride-in comfortableness of the vehicle.

Figure 6A:
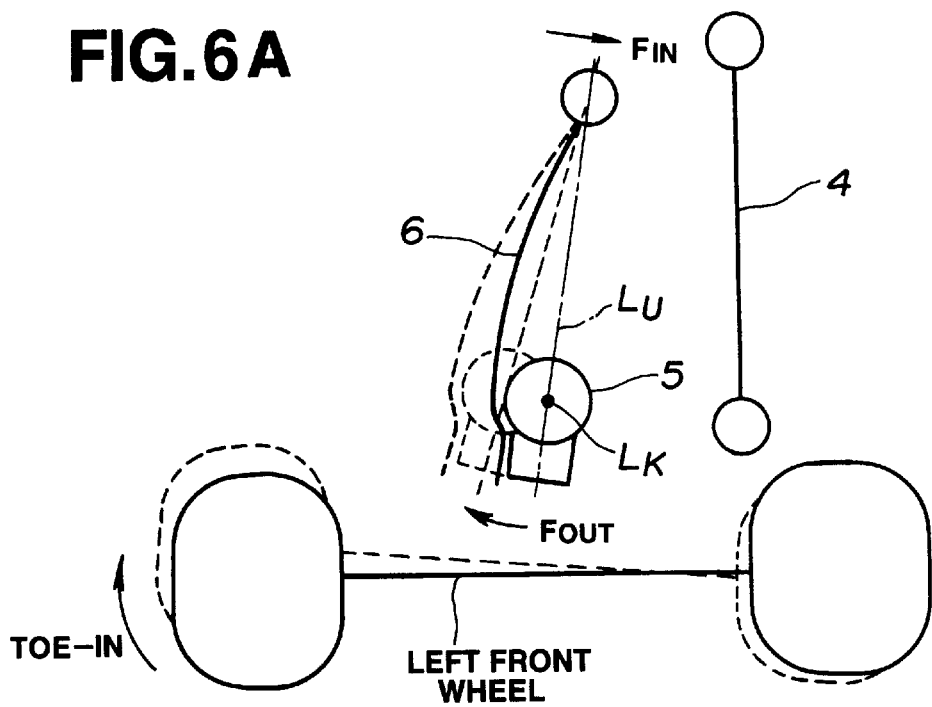
FIG. 6A is a schematic explanatory plan view of the front suspension of FIG. 1.
Figure 6B:
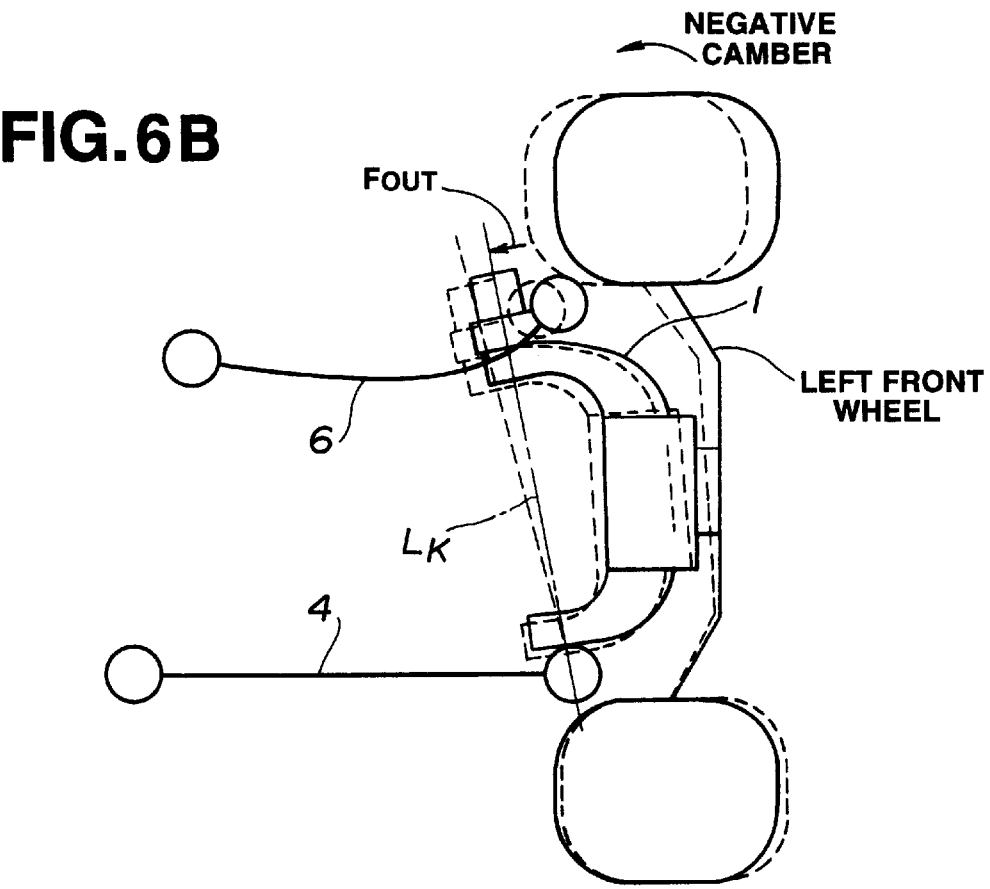
FIG. 6B is a schematic explanatory front view of the front suspension of FIG. 1.

In addition, when upward force is input to the front wheel, for example, owing to load of the vehicle and uneven condition of a road, the spring 16 provides downward force against the upward force onto the shock absorber 15 thereby establishing a balance between the upward and downward forces. The downward force from the spring 16 presses downward the cylinder tube 15a of the shock absorber 15, and therefore it is input to the rotatable connection member 5 through the support bracket 17 and the elastomeric bushings 12, 12. At this time, the rotatable connection member 5 generates a rotational torque around the axis $L_K$ of the installation shaft for the rotatable connection member 5 under the action of the force of the spring 16, since the axis $L_S$ of the spring 16 and the axis $L_K$ of the installation shaft for the rotatable connection member 5 are not parallel with each other and do not cross each other at any crossing point thereby establishing the so-called torsional locational relationship between the axes $L_S$ and $L_K$ as discussed above. However, the thus generated rotational torque can be balanced upon distortion of the elastomeric bushing 5g at the connection section between the rotatable connection member 5 and the upper link 6. Accordingly, as viewed from the above or in plan as shown in FIG. 5, the rotatable connection member 5 generates a rotational torque around the axis $L_K$ of the installation shaft K for the rotatable connection member 5, so that the elastomeric bushing 5g disposed inside the support section 5e (the connection section between the rotatable connection member 5 and the upper link 6) is distorted. At this time, under the action of a reaction of the distortion of the elastomeric bushing, a forward force $F_{OUT}$ is generated at the outboard-side end section of the upper link 6, and simultaneously a rearward force $F_{IN}$ is generated at the inboard-side end section of the upper link 6. As a result, as illustrated in FIGS. 6A and 6B, the upper link 6 is displaced at its side of the rotatable connection member 5 or of the steering knuckle 1, forward in the vehicle. Thus, in case that the inboard(vehicle body)-side end section of the upper link 6 is located rearward in the vehicle relative to the rotatable connection member 5 as in this embodiment, the steering knuckle (1) side of the upper link 6 moves forward and simultaneously moves toward the inboard side of the vehicle, so that a negative camber is provided to the front wheel. Additionally, the front section of the rotatable connection member 5 and the knuckle 1 located forward of the tie rod 8 are moved toward the inboard side of the vehicle, so that a toe-in is provided to the front wheel. Therefore, in case that the front wheel is an outside wheel in a turn of the vehicle, a turning performance of the vehicle can be improved.

Figure 7:
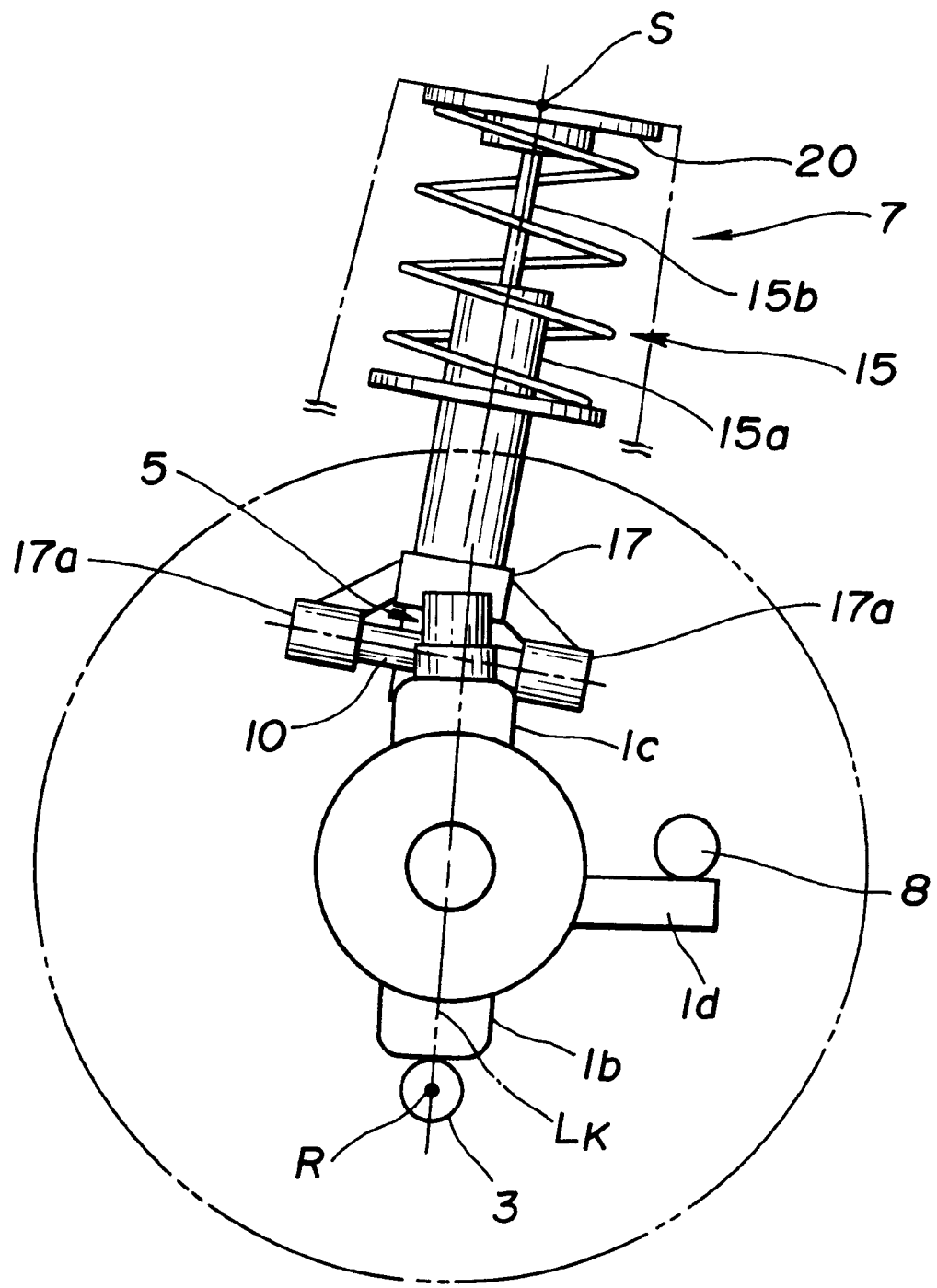
FIG. 7 is a schematic side view similar to FIG. 4 but showing a modified example of the front suspension of FIG. 1.

In contrast, in case that the inboard(vehicle body)-side end section of the upper link is located forward relative to the rotatable connection member, it will be apparent that when a rotational torque is applied to the rotatable connection member like in the above, the upper link moves in the opposite directions to that in the above in the width direction of the vehicle so that the front wheel moves in the opposite direction to that in the above since the supporting point for displacement of the upper link is different from that in the above. Additionally, as shown in FIG. 7, in case that the axis $L_S$ of the spring 16 inclines rearward relative to the axis $L_K$ of the installation shaft K for the rotatable connection member 5 as viewed from the side of the vehicle or on a vertical plane perpendicular to the width direction of the vehicle, a counterclockwise torque is applied to the rotatable connection member 5 conversely to the above. As a result, the outboard-side end section of the upper link 6 moves rearward, so that a positive camber and a toe-out are provided to the front wheel thereby improving the stability of the vehicle in a turn.

The reaction of the spring 16 increases and decreases with vertical movements of the front wheel. The toe angle, the camber angle, and the like of the front wheel can be changed in accordance with change in the spring reaction with the wheel stroke. Accordingly, change in camber angle and toe angle determined mainly in accordance with the layout and the like of suspension links can be appropriately set even in case that there is no freedom in layout, thus improving driving stability of the vehicle.

Furthermore, in this embodiment, the elastomeric bushing is disposed in the connection section between the upper link 6 and the vehicle body-side member 14 and between the upper link 6 and the rotatable connection member 5, and therefore the elastomeric bushing can suitably make its elastic deformation to be distorted under the action of the rotational torque which is from the rotational connection member 5 and generated by the reaction of the spring 16, so that a suitable angular change against the rotational torque can be obtained. Additionally, even in case that there is no precise crossing point at which the upper link axis $L_U$ and the axis $L_K$ of the installation shaft for the rotatable connection member 5 cross each other, for example, under production tolerance, a moment according to the distance of the axes can be received by the torsional rigidity of each elastomeric bushing thereby exhibiting the same function as that discussed above.

In this embodiment, the axis $L_S$ of the spring 16 and the axis $L_K$ of the installation shaft for the rotatable connection member 5 are always in the torsional locational relationship. In other words, the extensions of the axes $L_S$ and $L_K$ are in the locational relationship to be not parallel with each other and do not cross each other at a crossing point. Accordingly, even in a condition where there is no substantial wheel stroke, a reaction is generated at the spring 16 which receives the vehicle weight, and therefore the rotational torque is generated in the rotatable connection member 5, so that deformation due to torsion occurs or will occur in the elastomeric bushing 5g in the connecting section between the rotatable connection member 5 and the upper link 6 and in the elastomeric bushing 13 in the connecting section between the upper link 6 and the vehicle body-side member 14. However, the rotational torque to be applied to the rotatable connection member 5 under the action of the reaction of the spring 16 and the displacement of the upper link due to the reaction force are for setting the appropriate alignment changes such as the camber angle, the toe angle change and the like when the wheel stroke is make. Accordingly, by causing the rotational torque not to be applied to the rotatable connection member 5 in a condition where there is no wheel stroke, the elastomeric bushing does not or will not make its deformation due to the torsion, thereby making it possible to expect to improving the durability of the elastomeric bushing in an amount corresponding to no deformation. In order to attain such an arrangement, the axis $L_S$ of the spring 16 and the axis $L_K$ of the installation shaft K for the rotatable connection member 5 are arranged to be parallel with each other, and/or the extensions of the axes $L_S$, $L_K$ cross each other at a crossing point under a condition where no wheel stroke is made.

While the lower link 4 has been shown and described as being of the single body taking the A-shape in plan in the above embodiment, it will be understood that the lower link 4 may be constituted of two link members which are separate from each other, each link member having the generally I-shape. In this case, the two link members are forward and rearward lower link members which are respectively disposed forward and rearward in the vehicle. The forward lower link member is extended generally in the width direction of the vehicle, in which the outboard-side end section of the forward lower link member is rotatably connected through a ball joint or the like to the front part of the lower end section 1b of the steering knuckle 1, and the inboard-side end section of the same link member is connected through the elastomeric bushing (4a) to the vehicle body-side member such as the suspension member. The rearward lower link is curved to bulge forward in the vehicle and disposed inclined relative to the width direction of the vehicle in such a manner that the inboard-side end section is located rearward relative to the outboard-side end section. The outboard-side end section is rotatably connected through a ball joint or the like to the rear part of the lower end section 1b of the steering knuckle 1, and the inboard-side end section is connected through the elastomeric bushing 4b to the vehicle body-side member such as the suspension member.

The restraining action of the lower link constituted of the two link members to the steering knuckle is not problematic because the two link members are assumed to be formed by merely separating the A-type lower link. It is to be noted that the substantial connecting point R between the lower link and the steering knuckle corresponds to a crossing point of a first line connecting the vehicle body-side connecting point and the steering knuckle-side connecting point of the foreword lower link member and a second line connecting the vehicle body-side connecting point and the steering knuckle side connecting point of the rearward lower link member. Accordingly, as viewed from the front of the vehicle, freedom in setting the inclination angle of the (imaginary) kingpin can be increased relative to the embodiment of FIGS. 1 to 5 in an amount corresponding to the outboard-direction shift of the substantial connecting point R between the lower link and the steering knuckle. This offers the following advantages: In case that a front suspension including the thus arranged lower link is employed in a front-wheel-driving vehicle, the kingpin inclination angle is enlarged so that a so-called scrub radius (a distance between the crossing point of the kingpin with the road surface and a center of the road contacting surface of the tire) is set negative, thereby suppressing toe-in change due to torque steer during driving and omitting a turning moment for applying a large braking force to one of the front wheels in a turn of the vehicle. This improves driving stability of the vehicle while improving ride-in comfortableness of the vehicle by suppressing so-called shimmy phenomena which is caused upon transmission of the resonance vibration of a steering gear (under force input from road surface) to a steering wheel.

Figure 8:
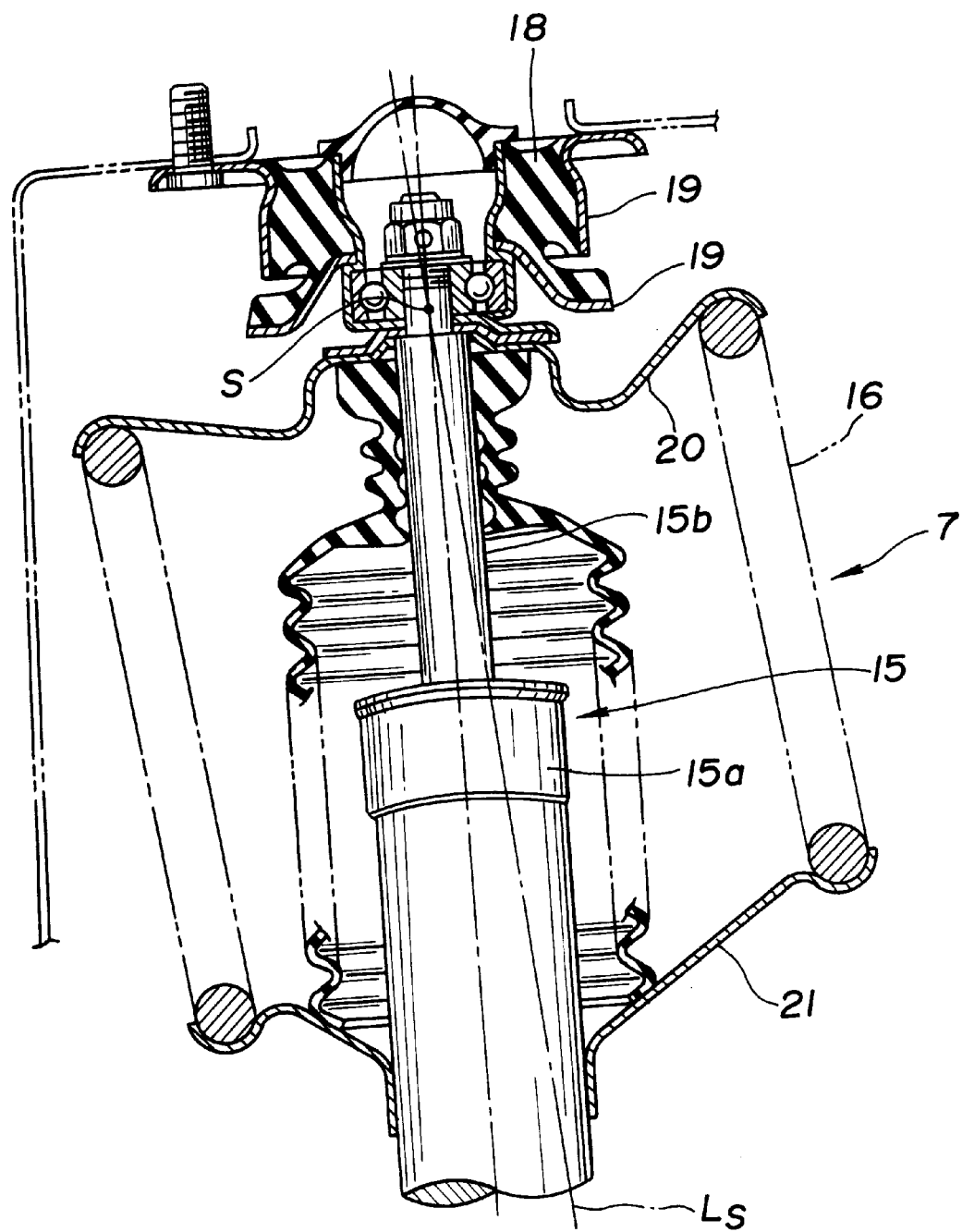
FIG. 8 is a schematic side view similar to FIG. 3 but showing a modified example of the strut of FIG. 3.

While the above-discussed embodiment has been shown and described as employing the strut 7 of the input separation type wherein force inputs to the vehicle body from the spring 16 and the shock absorber 15 are made respectively through separate paths, it will be appreciated that the strut 7 may be of a so-called input concentration type wherein the force inputs to the vehicle body from the spring 16 and the shock absorber 15 are made through the same path as shown in FIG. 8 obtaining the same advantageous effects as those in the above-discussed embodiment. In this input concentration type strut 7, the axis $L_S$ of the spring 16 passes through the connecting point S between the shock absorber 15 and the vehicle body-side member 14 and passes through the axis $L_P$ of the connection shaft 10 between the shock absorber 15 and the rotatable connection member 5. Accordingly, a rotational torque cannot be input around the axis $L_P$ of the connection shaft 10 between the shock absorber 15 and the rotatable connection member 5 even when a vertical force due to the vehicle weight and the like is input to the front wheel, thereby making it possible to reduce friction of the shock absorber thus improving the ride-in comfortableness of the vehicle.

What is claimed is:

1. A front suspension for a vehicle comprising:
   a wheel supporting member for rotatably supporting a road wheel of the vehicle;
   a lower link having a first end section rotatably connected to a lower section of said wheel supporting member, and a second end section connected to a vehicle body-side member so as to be swingable generally in a vertical direction of the vehicle;
   a connection member relatively rotatably installed to an upper section of said wheel supporting member so as to be relatively rotatable around a first axis which passes through said wheel supporting member and extends generally in the vertical direction of the vehicle;
   a shock absorber having an upper end section pivotally connected to the vehicle body-side member, and a lower end section swingably connected to said connection member to be rotatable around a second axis which extends generally in a fore-and-aft direction of the vehicle;
   a spring supported by said shock absorber and having a third axis, an extension of the third axis being separate from an extension of the first axis on a horizontal plane extending in a horizontal direction of the vehicle, the third axis inclining relative to the first axis on a vertical plane extending in the vertical direction of the vehicle;
   an upper link having a first end section swingably connected to said connection member, and a second end section swingably connected to the vehicle body-side member, said upper link having a fourth axis which connects a first connecting point at which the first end section is connected to said connection member and a second connecting point at which the second end section is connected to the vehicle body-side member, the fourth axis crossing the first axis on the vertical plane and on the horizontal plane; and
   a tie rod for turning said wheel supporting member upon its movement in the width direction of the vehicle in accordance with a steering operation for the vehicle.

2. The front suspension as claimed in claim 1, wherein said spring has an upper end section installed to the vehicle body-side member, the extension of the third axis of the spring crossing the extension of the first axis on the vertical plane in a condition where the wheel and said wheel supporting member make no vertical movement.

3. The front suspension as claimed in claim 1, wherein said spring has an upper end section installed to the vehicle body-side member, the extension of the third axis of the spring being parallel with the extension of the first axis on the vertical plane on a condition where the wheel and said wheel supporting member make no vertical movement.

4. The front suspension as claimed in claim 1, wherein said spring has an upper end section installed to the vehicle body-side member, and a lower end section installed to said shock absorber, the extension of the third axis of the spring crossing the second axis on the vertical plane.

5. The front suspension as claimed in claim 1, wherein said spring has an upper end installed to an upper section of said shock absorber, the extension of the third axis of the spring crossing the first axis on the vertical plane in a condition where the wheel and said wheel supporting member make no vertical movement.

6. The front suspension as claimed in claim 1, wherein said spring has an upper end installed to an upper section of said shock absorber, the extension of the third axis of the spring being parallel with the first axis on the vertical plane in a condition where the wheel and said wheel supporting member make no vertical movement.

7. The front suspension as claimed in claim 1, wherein said spring has an upper end installed to an upper section of said shock absorber, and a lower end connected to said shock absorber, the extension of the third axis of the spring crossing the second axis on the vertical plane.

8. The front suspension as claimed in claim 1, wherein the first end section of said upper link is connected to said connection member through a first connecting section including a first elastomeric bushing, and the second end section of said upper link is connected to the vehicle body-side member through a second connecting section including a second elastomeric bushing.

9. The front suspension as claimed in claim 8, at least one of axes of the first and second elastomeric bushings is generally perpendicular to the fourth axis of the upper link on the vertical plane.

10. The front suspension as claimed in claim 1, wherein the first and second end sections of said upper link are connected at the first and second connecting points with said wheel supporting member and the vehicle body-side member, respectively, the first and second connecting points being separate from each other in the fore-and-aft direction of the vehicle.

11. The front suspension as claimed in claim 1, wherein the first end section of said lower link is connected at a third connecting point to the lower section of said wheel supporting member, wherein the first axis generally passes through the third connecting point.

12. The front suspension as claimed in claim 1, wherein the first end section of said upper link is connected at the first connecting point to said connection member, the first connection point being located at an outboard side relative to the first axis.

13. The front suspension as claimed in claim 1, wherein the second end section of said lower link has first and second link portions which are separate from each other and swingably connected to the vehicle body-side member.

* * * * *